Aug. 4, 1970     F. C. TRAYER     3,522,404

TOTALLY ENCLOSED COMPONENT

Filed Nov. 22, 1967     2 Sheets-Sheet 1

INVENTOR.
FRANK C. TRAYER
BY
Schapp & Hatch
ATTORNEYS

INVENTOR.
FRANK C. TRAYER
BY Schapp & Hatch
ATTORNEYS

3,522,404
TOTALLY ENCLOSED COMPONENT
Frank C. Trayer, 25690 La Lanne Court,
Los Altos Hills, Calif. 94022
Filed Nov. 22, 1967, Ser. No. 685,164
Int. Cl. H01h 9/04
U.S. Cl. 200—168                                17 Claims

ABSTRACT OF THE DISCLOSURE

An encapsulated electrical component for installation in medium-voltage power cables between the source and the load, having a circuit element to be interposed between source and load, such as a fuse, a current transformer, a switch or a potential indicator, surrounded by a jacket of electrically insulating material, either a fluid insulating material contained in a canister enveloping the circuit element, or a solid insulating material formed around the circuit element and connectors permanently mounted on either the canister or the block of insulating material and electrically connecting the circuit element to the cables. The connectors are formed to mate with complementary connectors on the cable to form a removable and re-engageable hermetically sealed, low leakage, long dielectric path connection. In one form of the invention, a piece of transparent insulating material extends from the exterior of the insulating material to the vicinity of a potential-indicating gas discharge device near the circuit element to conduct light to the exterior of the component to indicate potential present. In another form, one wall of the canister is made flexible so that a vacuum circuit breaker within the insulating material may be operated from outside the insulating material by flexing the wall. In another form, a toggle linkage inside the canister is operated by hydraulic or pneumatic cylinders or electrical solenoids to open and close a vacuum circuit breaker.

BACKGROUND OF THE INVENTION

This invention relates to a totally enclosed component, and more particularly to a medium-voltage component for insertion in a supply cable between source and load.

Encapsulation, or "potting," of circuit elements is known in the prior art, both for low and medium voltage elements. However, where such components were made removably and replaceably connectable to the conductors leading to them, such as by plug-in or clip-type terminals, the encapsulation did not extend to protection of the terminals. Hence, when mounting such components in a hostile environment, particularly in the medium-voltage range of application (600 to 23,000 volts), additional protection, such as a sealed junction box, was required.

In practice, the convenience of plug-in type connection was often sacrificed by forming permanent sealed connections between the circuit element and the supply cable, such as the "wiped" lead joint. To replace such a connection, the joint had to be sawed loose, and then laboriously rewiped, with a consequent unfortunate shortening of the supply cable. Where wiped or similar semi-permanent joints were not used, the cable had to be detoured out of the hostile environment, or expensive enclosures had to be used to protect the joint, or both. Such detours added costly length to the supply cable, and were wasteful of power and space as well.

A further problem is encountered with plug-in connectors at the upper end of the medium voltage range, due to the corona discharge caused by the high voltage. The discharge created reactive compounds from the air, such as oxides of nitrogen, and ozone. The compounds, in turn, attacked the conductors and insulation. The problem is further aggravated if water vapor is present to form nitrous and nitric acids with the oxides of nitrogen.

SUMMARY OF THE INVENTION

The present invention provides a totally encapsulated electrical circuit element for medium voltage applications in the cable run between source and load and having plug-in type connectors which provide a readily removable and re-engageable hermetic, low-leakage, long-dielectric path joint between the component and the supply cable. The encapsulated component may thus be installed directly in the cable run without any protection beyond that normally afforded the cable. Because the circuit element is totally encapsulated, the connectors sealed to the component and hermetically sealed to the connectors on the cable, further enclosure is unnecessary; the vulnerable terminal portions have been effectively included within the encapsulation.

At the same time, the connectors on the cable may be readily separated from the connectors on the encapsulated component by the application of a moderate amount of force in the proper direction. This ready removability has made feasible the use in-the-line of expendable elements such as fuses, where such use was barred before by the prohibitive expense and trouble of breaking and remarking the weatherproof connections to replace the fuse. Other in-the-line components also benefit from the ease of removal for servicing or replacement.

The present invention also makes possible the use of mechanically actuated vacuum circuit breakers in-the-line where this was not practical before. Such circuit breakers are commonly operated by axial tension which parts the contacts sealed within a protective envelope. If applicant's component is in the fluid-filled form, a wall of the canister or container confining the fluid may be made flexible, so that the requisite tension or pressure may be applied from the outside to part and engage the conductors. Alternatively, the axial tension to operate the circuit breaker may be supplied by an insulated toggle linkage within the container. Motive force may be supplied to the toggle linkage by pneumatic or hydraulic cylinders, or by electrical solenoids.

Corona discharge at high voltage levels at the joint between the connectors is greatly reduced by the sealed nature of the joint formed by the connectors of the present invention. Intrusion of atmospheric gases into the vicinity of the energized conductor is prevented, and liquid water and water vapor are likewise barred, so that the formation of ozone, oxides of nitrogen, nitrous and nitric acids is virtually eliminated. Should the joint be merely moisture-proof, some advantage would be gained, both in terms of reduced production of the acids due to interaction of water and the oxides of nitrogen and in terms of keeping the dielectric constant of the insulating material surfaces from being reduced by the formation of water-based electrolytes on those surfaces.

By reducing the production of corona-created corrosive substances, applicant's component makes more feasible the installation of plug-in medium voltage components in such hostile environment as moist locations without requiring either expensive further moisture-proof enclosure or moisture-proofing applied to the joint which would interfere with the plug-in convenience of removal. The hermetic nature of the seal at the joint between the connectors also makes possible installation in explosive atmosphere.

As the circuit element itself is completely encapsulated within insulating material, no air space is left around it to cause problems from voltage stress on entrapped air. If shielding is desired, the outer surface of the insulating material may be coated with conductive material, or a metal canister may be used to enclose the circuit element, as with the fluid-insulated forms of the component. The outer surface of the connectors may be made conductive as well so that when the component is connected to the cable, a continuous conductive shielding is formed extending from the cable, through the connectors and around the circuit element.

Accordingly, it is a principal object of the present invention to provide a totally enclosed component of the character described in which the component connectors and cable are completely sealed against a hostile environment and require no further protective enclosure.

It is a further principal object of the present invention to provide a totally enclosed component of the character described in which the connectors between the component and the cable may readily be disconnected and reconnected without adversely affecting the electrical or mechanical characteristics thereof.

Another object of the present invention is to provide a component of the character described for medium-voltage applications having very low power loss and corona effect about the joint between the connectors.

A further obect of the present invention is to provide a totally encapsulated circuit element of the character described which may be simply and economically installed in and removed from a run of bulky, stiff medium voltage cable with a minimum of special skill and equipment.

Yet another object of the present invention is to provide a component of the character described having connectors which maintain a high degree of electrical insulating properties in hostile environments in medium voltage range applications.

Still another object of the present invention is to provide a component of the character described making feasible the use of expendable circuit components directly in a cable run.

A still further object of the present invention is to provide a component of the character described which will permit a remotely actuated vacuum circuit breaker to be installed directly in the supply cable run without further enclosure.

Still another object of the present invention is to provide a component of the character described which eliminates entrapment of air near the energized conductor.

BRIEF DESCRIPTION OF THE DRAWINGS

The preferred forms of the present invention are illustrated in the acompanying drawings, forming part of this application, in which.

Figure 1:
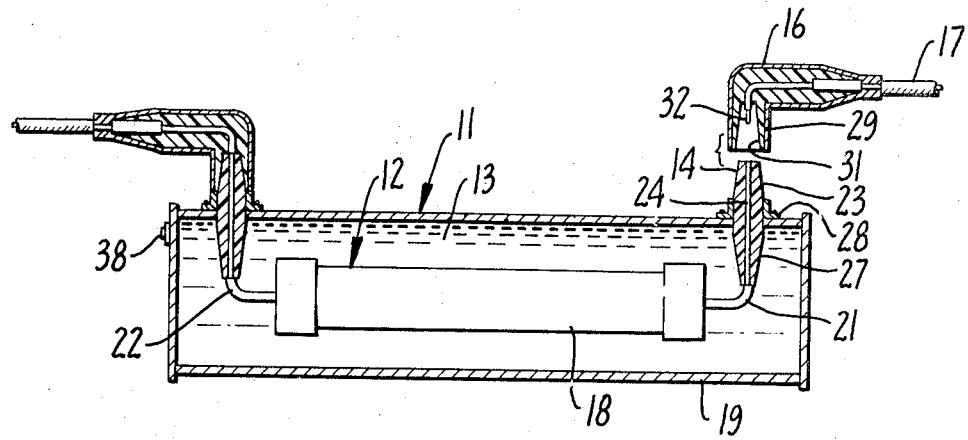
FIG. 1 is a side elevational view taken partially in cross-section, of an electrical component constructed in accordance with the present invention.

While only the preferred form of the invention has been shown, it should be understood that various changes or modifications may be made within the scope of the claims attached hereto, without departing from the spirit of the invention.

DESCRIPTION OF THE PREFERRED EMBODIMENTS

Referring to the drawings in detail, it will be seen that the encapsulated electrical component 11 of the present invention comprises a circuit element 12 to be protected, a defined mass of electrically insulating material 13 surrounding and enclosing the element 12 to protect it, a first connector 14 sealed to the mass of insulating material 13, and a second connector 16 adapted to be sealed to the cable 17. The connectors 14 and 16 are adapted for releasably and re-engageably mating with each other to electrically couple the cable 17 to the circuit element 12 and to form a continuous vaporproof electrical insulation between the mass of electrically insulating material 13 and the cable 17. Thus the component 11 may be installed directly in a run of the cable 17 in a hostile environment without need of further enclosure against that environment.

Figure 3:
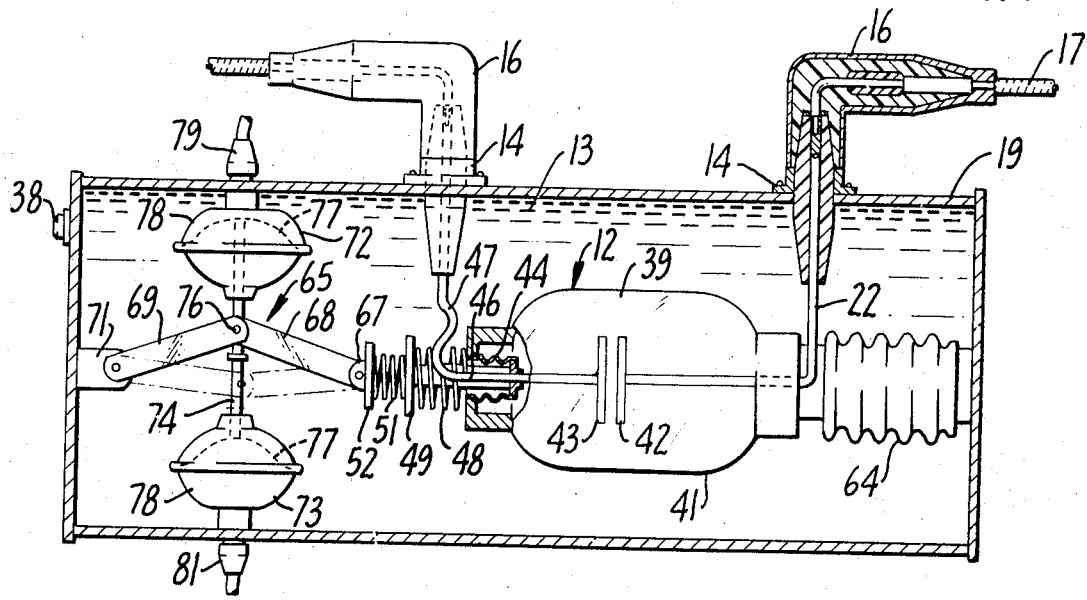
FIG. 3 is a side elevational view on an enlarged scale taken partially in cross-section, of a third embodiment of the component.
Figures 4, 5:
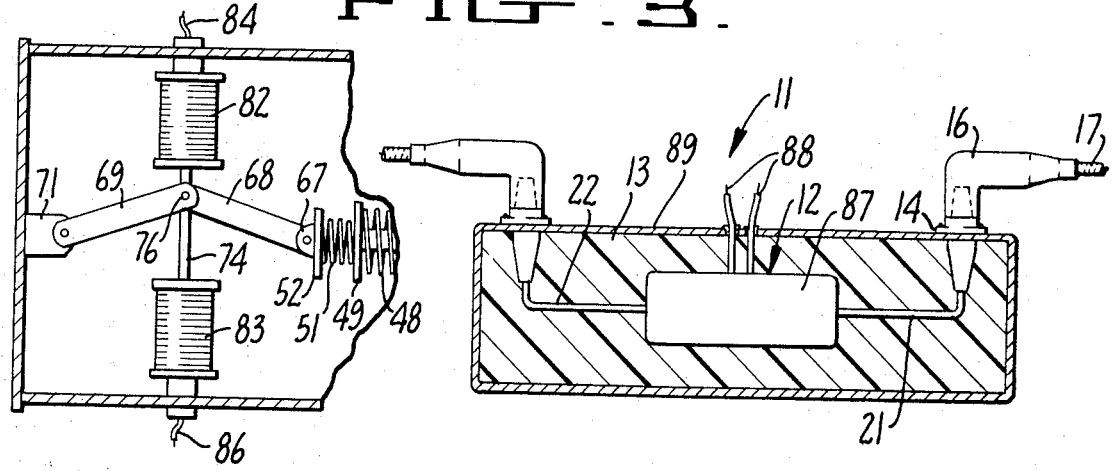
FIG. 4 is a side elevational view on an enlarged scale taken partially in cross-section of a modified form of the embodiment shown in FIG. 3.
FIG. 5 is a side elevational view taken partially in cross-section of a fourth embodiment of the component of the present invention.

The protected circuit element 12 is of the type usually interposed in the path of an electrical supply cable between the power source and the power-consuming load, such as a current-limiting fuse (FIG. 1), a vacuum circuit breaker (FIGS. 2, 3, and 4), or a current transformer (FIG. 5). Other in-the-line type circuit elements may also be used.

In the form of the invention shown in FIG. 1, the circuit element 12 is shown as a current-limiting fuse 18 of the non-expulsion type, such as a silver-sand fuse. The non-expulsion type of fuse is preferable in this situation, as the component is sealed. As here shown, the defined mass of electrically insulating material 13 is a body of fluid of high dielectric constant, such as transformer oil, surrounding the fuse 18. The oil is contained by a hollow container 19, which may be a steel tank. The insulating material could also be a solid of high dielectric strength, as shown in FIG. 5, for those applications not requiring any moving parts within the insulating material.

Typical of such solid materials would be asphaltic potting compound, butyl rubber, ethylene, propylene terpolymer, and epoxy plastics, but many other materials could likewise be used. Some of the solid insulating materials would possess sufficient mechanical strength and cold flow resistance to be self-defining permitting omission of the container 19.

The ends of the fuse 18 are connected to conductors 21 and 22 leading to the connectors 14. The connectors 14 are in the form of bushings of electrically insulating material 23 extending through the wall of the tank 19 and surrounding a central conductor 24. As may be seen on the enlarged scale of FIG. 2, the end of the conductor 24 is formed into a female receptacle 26.

The portion of the bushing 23 extending outward from the tank 19 is generally in the form of truncated cone, tapering to a smaller diameter in the direction away from the tank 19 and surrounding the female receptacle 26. The portion of the bushing 23 extending into the tank 19 is formed into a generally cone-shaped body 27 of insulating material surrounding the central conductor 24 for electrical stress relief. A flange 28 surrounds the bushing 23 to mount it on the tank 19. The flange 28 may be of conductive material to mate with the conductive shield of the second connector 16 and electrically connect it to the tank 19. A suitable bushing answering the above description is manufactured by the Elastic Stop Nut Corp. of America, Hackettstown, N.J., under the Catalog No. 180–S1.

The second connector 16 is formed to mate with the first connector 14, and includes a body of electrically insulating material 29 formed with a cavity 31 of shape complementary to the exterior portion of the bushing 23. A male conductor prong 32 is located generally centrally axial of the cavity 31 and is shaped to mate with the female receptacle 26 to form a positive, low resistance electrical contact. As may be seen, the configuration of the bushing 23 and the cavity 31 are such that the insulating material of the cavity 31 overlies and firmly contacts the conical surface of the bushing 23. The dimensions of the cavity 31 and the characteristics of the insulating material 29 are such that a hermetic seal is formed along the joint with the bushing 23 and voltage leakage along the joint is decreased. The material 29 may be an ethylene-propylene terpolmer, and a suitable connector 16 answering the above description is manufactured by the same manufacturer as the bushing 23, under Catalog No. 150–LR.

The insulating material 29 of the connector 16 is here shown surrounded by a jacket of conductive material 33 which contacts the conductive jacket of the cable 17 and the conductive flange 28 of the bushing 23. The conductive material shields the cable and connector to reduce and distribute the voltage stress on the insulating material. Inserts of similar conductive material 34 and 36, which may be an electrically conductive epoxy plastic, surround the conductor 37 within the connector 16 in the areas of the connector 16 in which small amounts of air may remain entrapped when the connector is connected to the cable 17 and to the bushing 23. Inserts 34 and 36 serve to reduce the voltage stress on any such entrapped air, thereby inhibiting corona effects.

The circuit element, such as the fuse 18, may be supported within the tank or container 19 by appropriate standoff insulators or brackets, or it may hang from the bushings 23 as shown in FIG. 1, with the bushings 23 thus serving the triple function of connectors, feedthrough insulators, and support posts. A plug 38 is provided for filling the tank 19 with insulating fluid.

Figure 2:
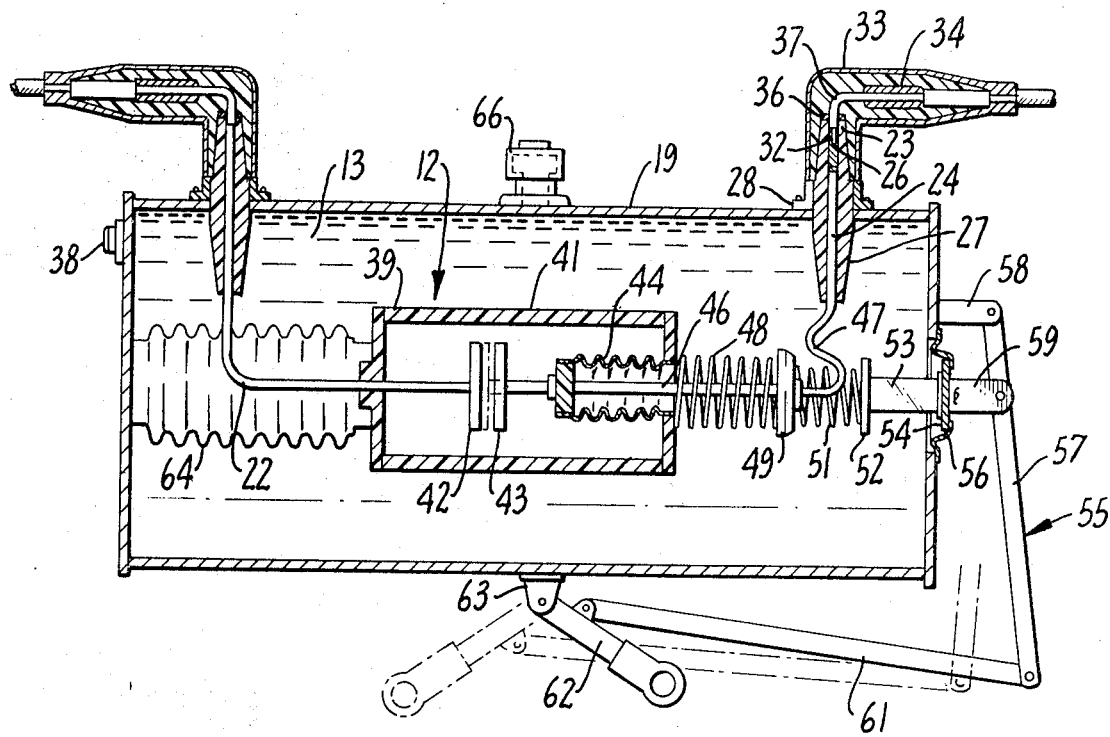
FIG. 2 is a side elevational view on an enlarged scale taken partially in cross-section of another embodiment of the component of the present invention.

In the embodiment shown in FIG. 2, the circuit element is a vacuum circuit breaker or switch 39, with the connectors 14 and 16 and the tank 19 remaining similar to those shown in FIG. 1. The circuit breaker 39 includes an insulating envelope 41, which may be glass, containing a vacuum, and fixed and moveable switch contacts 42 and 43 respectively. Switch contact 43 is permitted to move by the action of a metal bellows structure 44 sealed to the envelope 41 and to a conductor 46 leading from the movable contact 43. The conductor 22 communicates the fixed contact 42 with one of the bushings 23. Conductor 46 has a flexible portion 47 leading to the other bushing 23.

The switch 39 is actuated by reciprocating the conductor 46 to move the contacts 42 and 43 in and out of contact with each other. A bias spring 48 extends between the envelope 41 and a stop 49 attached to the conductor 46 to bias the switch normally open. An overtravel spring 51 extends from the stop 49 to another stop 52 attached to a link member 53, formed of insulating material such as Lucite or a glass fiber-polyester composition, such as Fiberglas. The over-travel spring 51 prevents damage to the switch 39 from excessive closing force. The link member 53 extends to a plate 54 forming a portion of the wall of the tank 19. The plate 54 is attached to the tank 19 by a flexible metal diaphragm 56, permitting the plate 54 to be flexed in and out to reciprocate the conductor 46 to operate the switch.

The plate 54 is flexed by an actuating toggle mechanism 55 outside the tank 19 including a lever arm 57 pivotally mounted on the tank 19 by a bracket 58. A link 59 is mounted on the exterior of the plate 54 and pivotally attached to the lever arm 57. An actuating arm 61 extends from the lever arm 57 to an actuating handle 62, and is pivotally attached to both. The handle 62 is in turn pivotally mounted on the tank 19 by a bracket 63.

The bracket 63 extends out far enough from the tank 19 so that a toggle action is obtained when the handle 62 is moved fully clockwise to lay adjacent the surface of the tank 19, locking the switch in a closed position. This position, with the handle 62 fully clockwise, is one stable state or position of the toggle mechanism 55, as this position is slightly clockwise of the point of maximum leftward (as seen in FIG. 2) extension of the actuating arm 61. The other stable position or state is with the handle 62 somewhat counterclockwise from the point of maximum extension of actuating arm 61. As here shown in switch contacts 42 and 43 are brought into contact in the first mentioned stable state or position, and are separated in the second stable state, by a distance sufficient to extinguish an arc between them.

Retentive force for holding the handle 62 in locked position is supplied by the pressure of the insulating fluid 13 in the tank 19 and the springs 48 and 51. The handle 62 and link arm 61 have been illustrated as located along the bottom of the component 11, but they may be located in any convenient position by rotating the entire apparatus 57, 58, 59, 61, 62 and 63 about the long axis of the component 11, so that the handle will be located alongside or atop the tank 19, as desired.

A standoff insulator 64 may be used to support the circuit breaker 39 within the tank 19 and to resist the thrust applied to close the switch contacts. As the movement of the metal bellows 44 causes a small change in the volume of the tank 19, a small air trap 66 is provided to trap air when the tank is filled with the fluid 13, to absorb this small volume change. The air trap 66 also serves to prevent actuation or injury to the switch 39 by expansion of the oil due to heating.

In the form of the invention shown in FIG. 3, the vacuum switch 39 and the connectors 14 and 16 are essentially the same as shown in FIG. 2, but with an actuating toggle linkage 65 completely contained within the tank 19. In this form of toggle mechanism, a bracket 67 is attached to the stop member 52, and a link member 68, formed of insulating material similar to link 53 in FIG. 2, is pivotally attached at one end to the bracket 67. The other end of the link member 68 is pivotally attached to another link member 69, which is in turn pivotally attached at its opposite end to a bracket 71 mounted on a wall of the tank 19.

As here shown, pneumatic cylinders 72 and 73 are mounted on the walls of the tank 19 and connected to a common actuating rod 74. The rod 74 is connected to the common point 76 of the links 68 and 69, so that when the rod 74 is reciprocated by the cylinders 72 and 73, the toggle linkage 65 is moved from the position shown in solid to that shown in phantom, or vice versa. The maximum downward extension of the rod 74, as seen in FIG. 3, coincides with a position of the toggle linkage 65 just beyond the overcenter point, so that in the position shown in phantom, the linkage has just slightly less than its maximum lateral extension, and is in one of its stable states or positions. In this extended position, the movable switch contact 43 is moved into contact with the fixed contact 42. Contact is interrupted when the linkage is in its retracted position, representing the other stable states as shown in solid lines in FIG. 3. In the retracted position, the contacts 42 and 43 are separated a distance sufficient for arc extinguishment. As with the form shown in FIG. 2, the springs 48 and 51 help lock the toggle mechanism in one or the other of its positions.

In the present embodiment, the cylinders 72 and 73 are of the diaphragm type, having a diaphragm 77 attached on one side to the rod 74, and confronting on the other side a chamber 78 to which air may be supplied through nipples 79 and 81 located on the exterior of the tank 19. However, one double-acting cylinder could be used in place of the two single-acting cylinders shown, with the nipples 79 and 81 appropriately connected to its chambers. Moreover, the actuating cylinders 72 and 73 could be hydraulic cylinders, either two single acting or one double acting, instead of air cylinders.

As illustrated in FIG. 3, application of air pressure to nipple 79 will cause the toggle linkage to move to the phantom position and close the switch 39. The switch will remain locked in this position until air is applied to nipple 81 and the linkage is driven to the position shown as solid, allowing the contacts 42 and 43 to separate under the action of the spring 48. The nipples 79 and 81 have been shown on opposite sides of the tank 19 for simplicity, but could be relocated to any convenient site on the tank 19. For instance, the nipples could quite readily be located both on the uppermost surface of the tank, especially if one double-acting cylinder is used instead of the two cylinders 72 and 73 shown.

As shown in FIG. 4, solenoids 82 and 83 may be substituted for the air cylinders 72 and 73, with the solenoid actuating current supply leads 84 and 86 being brought out through the wall of the tank 19 to the exterior, to lead to a controllable source of actuating current for the solenoids (not shown). In operation, this form of the switch would be essentially the same as the form of FIG. 3. Again, as in FIG. 3, one double-acting solenoid could be used to both push and pull the common point 76 of the toggle mechanism, instead of the two solenoids 82 and 83.

FIG. 5 depicts another embodiment of the encapsulated electrical component of this invention, in which the circuit element 12 is a medium voltage, high burden current transformer 87. The current transformer 87 has current sensing leads 88, which are brought out through the insulating material 13 to the exterior of the component 11. As the insulating material 13 is here shown in the solid form, the tank 19 shown in FIGS. 1 through 3 may be dispensed with. The leads 88 are then moulded right into the body of the insulating material 13, producing a good seal around the leads. However, if a fluid insulating material is used, the leads 88 may pass through suitable gaskets in the wall of the tank 19, to produce a leakproof and moistureproof seal.

The leads 88 carry a low current proportional to the high current passing through the encapsulated component 11 on conductors 22 and 23. As the voltage level on the leads 88 is also reduced, the leads 88 may be conducted to a measuring instrument (not shown) at a remote location using only conventional low voltage techniques for their insulation.

If, as here shown, the component 11 is constructed with solid insulating material 13 and the tank 19 is omitted, a thin coat of conductive material 89, such as a conductive epoxy plastic, may be applied to the exterior surface of the insulating material 13, to serve to shield the component and its insulating material 13 in the same fashion as the conductive jacket 33 on the connector 16. This coating 89 would be contacted by the conductive material of the flange 28, so that the conductive jacket surrounding the cable 17 would be continued through the conductive material 33, the flange 28 and through the coating 89 to the other connectors 14 and 16.

Figure 6:
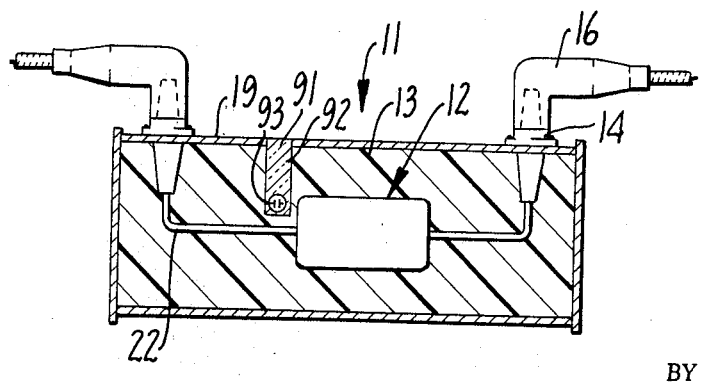
FIG. 6 is a side elevational view taken partially in cross-section of a modified form of the electrical component of the present invention.

In the modified form of the component 11 shown in FIG. 6, a potential indicator 91 is included in addition to the circuit element 12. The potential indicator 91 includes a piece of transparent electrically insulating material 92 extending from the outside of the component 11 to a gas discharge lamp 93 disposed in the vicinity of the circuit element 12 or the lead 22 connected to the element 12. The transparent electrically insulating material may be glass or a plastic material such as Lucite, and the lamp 93 may be a small neon or argon lamp. The electrodes of the lamp 93 need not be connected to anything, as the lamp is excited by the presence of the high potential in the vicinity. For convenience sake, the lamp 93 may be embedded in the end of the plug of insulating material 92, and the plug 92 in turn may be supported by the insulating material 13 if a solid insulating material is used, or by being attached to the wall of the tank 19 if a fluid insulating material 13 is used.

The glow of the lamp 93 when the high voltage is present may be seen through the insulating material 92, to indicate the presence of the voltage. Although the potential indicator 91 may be used with any of the circuit elements 12 shown in the previous figures, or even with a straight conductor as a circuit element 12, it is most useful in connection with circuit-interrupting elements such as the fuse 18 or the vacuum switch 39, where it could serve to indicate interruption of the circuit by the fuse or switch. For this purpose, the indicator 91 could be located adjacent the load end (as opposed to the line, or supply end) of the circuit element 12. For the most positive indication of the operation of the fuse or switch, two potential indicators 91 could be included in the component 11, one on the line end of the circuit element 12 and the other on the load end. Thus failure of line supply current from other causes would be distinguished from interruption of the supply by the fuse or switch constituting the circuit element 12.

With the potential indicator 91 on the load end of circuit-interrupting type of components such as the fuse and the vacuum switch, the component may be unplugged from the cable while the line end of the cable is energized, as the absence of potential at the load end is positively indicated and no attempt will be made to remove the load end connector 16 if it is still energized. First, the vacuum switch is opened to interrupt current to the load, the potential indicator 91 checked for darkness, and then the load end connector 16 is unplugged and drawn away. As the load is removed, the line end connector 16 may then be removed even if it is still energized, if care is taken to prevent it from shorting to the surroundings. With the fuse 18 as the circuit element 12, the potential indicator 91 serves to positively indicate that the fuse is blown before the load end connector 16 is removed. As shown in FIG. 6, the load end would be the left hand side of the component, and the line end would be the right hand side.

It may be noted that the connectors 16 shown in all of the embodiments here are of a generally L-shaped form, with one leg co-axial with the bushing 23 and one leg generally co-axial with the cable 17. Straight line connectors, such as Elastic Stop Nut Corporation shielded connector Style 150–SR, may be used, but the L-shaped connector has been found to be unusually advantageous from two standpoints. First, very little slack is needed in the cable 17 to facilitate disconnection from the connector 14, as the cable is moved along an arcuate path, and is not required to move axially toward or away from the connector 14. Cables for the medium voltage range are generally quite bulky and resistant to movement, and the arcuate motion is much easier to accomplish than an axial motion.

Secondly, considerable thermal expansion and contraction may occur along the axis of the cable, and due to the bulk of the cable, this expansion is often not accommodated by side-play of the cable within its conduit. If the connectors 14 were located on the ends of the tank 19 and straight line connectors 16 such as the Style 150–SR mentioned above were used, thermal expansion of the cable 17 would place undue stresses upon the component along the axial direction of the component, and possibly damage the component, while thermal contraction of the cable 17 would tend to pull the connector 16 off the bushing 23, resulting in destruction of the hermetic seal between them. The configuration shown, with the connectors 14 atop the component 11 and L-shaped connectors 16 has been found to result in superior resistance to axial stress imposed by the cable.

While the component 11 of the present invention has been illustrated with a single circuit element 12 and a pair of connectors 14, a number of circuit elements could be enveloped within a single body of insulating material 13. Moreover, more than two connectors 14 could be provided where desired, such as to connect several load cables to a single line cable. Circuit elements of different types could likewise be combined in a single component.

For example, three fuses 18 could be provided, each connected to a pair of connectors 14, to protect a three phase circuit. Three vacuum switches 39 could likewise be ganged together to a single actuating toggle mechanism for joint interruption of a three phase circuit, or a fuse could be placed in series with each of the vacuum switches and potential indicators 91 placed on the load ends of each of the fuses, so that a phase failure could be detected from the indicators 91, and the vacuum breakers then operated to disconnect the other two phases to prevent damage to machinery. Many other networks of circuit elements and arrangements of bushings are likewise possible.

From the foregoing, it may be seen that a totally enclosed and encapsulated electrical component has been provided which is both itself sealed against the environment and sealed at its connectors so that no further enclosure is required, and which is readily connectable and disconnectable from the cable while retaining good insulating properties in the connectors and reducing the problems associated with corona breakdown of air at the connectors.

I claim:

1. A plug-in type encapsulated electrical component for installation at a point along the length of a medium-voltage supply cable between the ends thereof, comprising
   a circuit element to be protected,
   a defined mass of electrically insulating material surrounding and enclosing said circuit element to protect it,
   a first conector comprising at least a first power lead sealed to said mass of electrically insulating material with the first lead in electrical connection with the circuit element, and
   a second connector comprising at least a second power lead adapted to be sealed to the cable with the second lead in electrical connection with the cable, said first and second connectors being releasably and re-engageably mating with each other with the first lead in electrical connection with the second lead to electrically couple the cable to said circuit element and to form a continuous vapor-proof electrical insulation between said mass of electrically insulating material and the cable, all electrical power lead connections to said circuit element being electrically insulated to withstand hostile fluid immersion of said connections at the voltage levels imposed on said connectors, whereby the component may be installed directly in a run of the cable in a hostile environment in total insulation without the need of further enclosure against the hostile environment.

2. An electrical component as described in claim 1 and wherein said first and second connectors mate to form a reconnectable hermetic seal, whereby intrusion of air and vapor into the vicinity of the energized conductor of the cable may be prevented, the cable having an electrically conductive shield member at ground potential and said first and second connectors and said mass of electrically insulating material being enveloped in conductive material so that the shielding effect of the shield-member of the cable is carried through the first and second connectors to the component.

3. An encapsulated electrical component for installation in a medium-voltage supply cable between the ends thereof, comprising
   a circuit element to be protected,
   a defined mass of electrically insulating material surrounding and enclosing said circuit element to protect it, and
   high dielectric strength low-leakage-path connector elements electrically communicating with said circuit element and permanently hermetically sealed to said mass of electrically insulating material, and adapted to mate with complementary high dielectric strength low-leakage-path receptacle elements on the cable, said connector elements being adapted to releasably and hermetically seal to the receptacle elements to form an electrical conduction path from the cable through the connector elements to the circuit element which is hermetically isolated from the exterior environment, with the cable remaining readily disconnectable from and reconnectable to the encapsulated component, all electrical connector elements passing from the exterior environment into said mass of electrically insulating material being sealed from said exterior environment to prevent hostile fluid intrusion to the vicinity of the connector elements outside said mass of electrically insulating material whereby the circuit element and connector elements are totally insulated when installed.

4. A totally enclosed electrical component for readily removable installation in a run of medium-voltage cable between a source and a principal load, comprising
   a circuit element to be enclosed,
   a defined body of high dielectric strength material enclosing said circuit element from the exterior environment,
   first connector elements permanently and hermetically attached to said component and electrically communicating with said circuit element, and
   second connector elements adapted for sealed connection to the cable and formed of shape complementary to said first connector elements to mate with said first connector elements to form an hermetically sealed releasable and reconnectable joint of low leakage under high potential stress between the cable and the component, all electrical conductors passing from the exterior environment to the interior of said defined body being covered exteriorly of said defined body by fluid-impervious insulating material of thickness and dielectric strength sufficient to maintain electrical integrity of said connector elements in hostile environments under the voltage levels imposed thereon, whereby the component may be totally enclosed when installed in a hostile environment without need of enclosure for protection against that environment beyond that normally provided for the cable itself.

5. An electrical component as described in claim 1 and wherein said component includes a hollow container surrounding said circuit element and said mass of electrically insulating material comprises a fluid of high dielectric constant contained in said container, said first connector serving as a feedthrough insulator through the wall of said container for isolating said container from said circuit element.

6. An electrical component as described in claim 1 and wherein said mass of electrically insulating material is formed of a block of solid material of high dielectric strength and low leakage sealed around said circuit element, said first connector being mounted upon said block.

7. An electrical component as described in claim 1 and wherein said first connector comprises a truncated cone of electrically insulating material, with the diameter of the cone decreasing in the direction away from the component, and an electrical conductor located generally centrally axial of said truncated cone, and said second connector comprises electrically insulating material formed in a shape generally complementary to said first connector for mating therewith and an electrical conductor located generally centrally axial of said complementary shape and adapted to make positive electrical contact with the electrical conductor central to said truncated cone, said complementary shaped insulating material being adapted to overlie and firmly contact a portion of the conical surface of said truncated cone to hermetically seal the joint between the first and second connectors and to decrease voltage leakage along that joint to the exterior environment.

8. An electrical component as described in claim 1 and wherein said circuit element is a medium-voltage fuse element of the non-expulsion type.

9. An electrical component as described in claim 1 and wherein said circuit element is a medium-voltage high-burden current transformer, said current transformer having low-voltage, low-current leads brought through said electrically insulating material to the exterior environment for metering purposes.

10. An electrical component as described in claim 1 and wherein a potential-indicating gas discharge lamp is disposed within said mass of electrically insulating material in the vicinity of said circuit element and a piece of transparent electrically insulating material extends from the exterior environment to said lamp, whereby indication may be had from the exterior of the component of the presence of an electrical potential within the component.

11. An electrical component as described in claim 5 and wherein a portion of the wall of said container is constructed so that said portion may be flexed to change an internal dimension of said container and said circuit element is a vacuum switch having a movable contact and a fixed contact, said movable contact mechanically coupled to said portion for actuation of said switch by said change in internal dimension.

12. An electrical component as described in claim 5 and wherein said circuit element is a vacuum switch actuated by a solenoid and leads for supplying actuating current to said solenoid are brought out through said electrically insulating material to the exterior environment.

13. An electrical component as described in claim 1 and wherein said circuit element is a vacuum switch having a fixed contact and a movable contact actuated by a pneumatic cylinder enclosed within said mass of electrically insulating material and said component includes tubulation for supplying air to said cylinder passing from said cylinder through said mass of electrically insulating material to the exterior of said component.

14. An electrical component as described in claim 1 and wherein said circuit element is a switch actuated by a hydraulic cylinder enclosed within said mass of electrically insulating material and tubulation for supplying hydraulic fluid to said cylinder is brought out through said mass of electrically insulating material to the exterior of said component.

15. An electrical component as described in claim 4 and wherein said component is formed as an elongate mass and said first connector elements are mounted on the side of said component along its length with their axis generally transverse to the principal axis of said component, and said second connector elements are generally L-shaped.

16. An electrical component as described in claim 11 and wherein said component includes a toggle mechanism disposed outside said container and adapted to flex said portion between two positions, one of said positions corresponding to one of the stable states of said toggle mechanism and the other of said positions corresponding to the other of the stable states of said toggle mechanism, said movable contact being brought into contact with said fixed contact in one of said positions and withdrawn a distance from said fixed contact sufficient for arc extinction in the other of said positions.

17. An electrical component as described in claim 13 and wherein said component includes a toggle linkage having two stable states disposed within said container and mechanically coupled to said movable contact, said toggle linkage being of greater length in one of said stable states than in the other of said stable states and being operative in the longer of said stable states to bring said movable contact into contact with said fixed contact and to break contact between said movable contact and said fixed contact in the shorter of said stable states, said pneumatic cylinder being attached to said toggle linkage so that operation of said cylinder moves said toggle linkage from one of said stable states to the other of said stable states.

References Cited

UNITED STATES PATENTS

| | | | |
|---|---|---|---|
| 959,552 | 5/1910 | Kintner et al. | 337—204 |
| 2,839,636 | 6/1958 | Brown | 337—192 |
| 3,085,138 | 4/1963 | Brown et al. | 337—192 |
| 3,179,853 | 4/1965 | Kozacka | 337—186 |
| 3,307,137 | 2/1967 | Tordoff et al. | 174—18 |
| 3,328,690 | 6/1967 | Lockie et al. | 174—11.3 |
| 3,343,153 | 9/1967 | Waehner | 174—11.3 |
| 3,377,487 | 4/1968 | McNulty | 174—18 |

HERMAN O. JONES, Primary Examiner

U.S. Cl. X.R.

174—18; 337—186